United States Patent
Chen

(10) Patent No.: US 9,331,588 B2
(45) Date of Patent: May 3, 2016

(54) CONTROL CIRCUITS AND CONTROL METHODS FOR FLYBACK CONVERTERS AND AC-DC POWER CONVERTERS THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 137 days.

(21) Appl. No.: 13/868,942

(22) Filed: Apr. 23, 2013

(65) Prior Publication Data
US 2013/0301309 A1  Nov. 14, 2013

(30) Foreign Application Priority Data

May 8, 2012  (CN) .......................... 2012 1 0140876

(51) Int. Cl.
*H02M 3/335* (2006.01)
*H02M 1/42* (2007.01)

(52) U.S. Cl.
CPC ........ *H02M 3/33523* (2013.01); *H02M 1/4258* (2013.01); *Y02B 70/126* (2013.01)

(58) Field of Classification Search
CPC . H02M 3/335; H02M 1/4225; H02M 1/4258; Y02E 40/30
USPC ........... 363/21.01, 21.02, 21.04, 21.1, 89, 97, 363/21.12–21.18; 323/205, 207
See application file for complete search history.

(56) References Cited

U.S. PATENT DOCUMENTS

| | | | |
|---|---|---|---|
| 8,259,471 B2 * | 9/2012 | Li | H02M 3/33507 363/21.12 |
| 2012/0169245 A1 | 7/2012 | Chen | |
| 2012/0230064 A1 * | 9/2012 | Yang | H02M 3/33523 363/21.15 |
| 2012/0262961 A1 * | 10/2012 | Chien | H02M 3/33507 363/84 |
| 2012/0287682 A1 * | 11/2012 | Zhang | H02M 3/33507 363/21.16 |
| 2012/0299561 A1 | 11/2012 | Chen et al. | |

FOREIGN PATENT DOCUMENTS

CN  102055313 A  5/2011

* cited by examiner

*Primary Examiner* — Jue Zhang
*Assistant Examiner* — Lakaisha Jackson
(74) *Attorney, Agent, or Firm* — Michael C. Stephens, Jr.

(57) ABSTRACT

The present invention relates to control circuits and methods for a flyback converter and AC-DC power converters thereof. In one embodiment, a control circuit can include: (i) a turn-on signal generating circuit that is configured, in each switching cycle, to receive a drain-source voltage of a power switch of the flyback converter, and to activate a turn-on signal to turn on the power switch when the drain-source voltage reaches a valley value; (ii) a turn-off signal generating circuit that is configured, in each switching cycle, to activate a turn-off signal to turn off the power switch based on a power switch feedback error signal after a power switch conducting time interval has elapsed; and (iii) where input current and voltages of the flyback converter can be maintained as substantially in phase, and an output electrical signal of the flyback converter can be maintained as substantially constant.

20 Claims, 14 Drawing Sheets

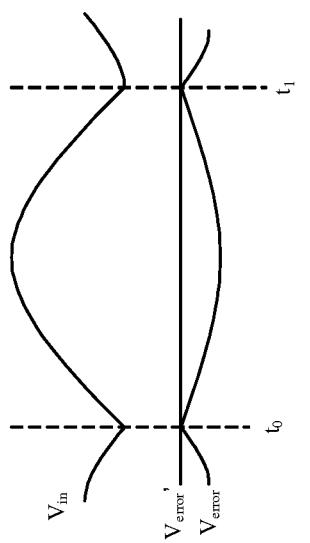

US 9,331,588 B2

CONTROL CIRCUITS AND CONTROL METHODS FOR FLYBACK CONVERTERS AND AC-DC POWER CONVERTERS THEREOF

RELATED APPLICATIONS

This application claims the benefit of Chinese Patent Application No. 201210140876.7, filed on May 8, 2012, which is incorporated herein by reference in its entirety.

FIELD OF THE INVENTION

The present invention relates to the field of power supplies, and more specifically, to control circuits and methods for flyback and AC-DC power converters.

BACKGROUND

Active power factor correction (APFC) is an important way to utilize energy in an efficient and low-pollution way. In APFC approaches, a power converter may be added between a bridge rectifier and an output capacitor filter, such that the power factor is close to 1. An APFC circuit can operate at a relatively high frequency switching state with characteristics of relatively small size, light weight, and high efficiency. Because of these characteristics, APFC has increasingly become a focus of power electronics technology research.

SUMMARY

Particular embodiments can be utilized in flyback and AC-DC power converters.

In one embodiment, a control circuit can include: (i) a turn-on signal generating circuit that is configured, in each switching cycle, to receive a drain-source voltage of a power switch of the flyback converter, and to activate a turn-on signal to turn on the power switch when the drain-source voltage reaches a valley value; (ii) a turn-off signal generating circuit that is configured, in each switching cycle, to activate a turn-off signal to turn off the power switch based on a feedback error signal of the power switch after a conducting time interval of the power switch has elapsed; and (iii) where an input current and an input voltage of the flyback converter are configured to be maintained as substantially in phase, and an output electrical signal of the flyback converter is configured to be maintained as substantially constant.

In one embodiment, an AC-DC power converter can include: (i) the control circuit as above; (ii) a rectifier circuit configured to convert an external AC sinusoidal voltage to a half sine wave DC voltage; (iii) a filter circuit configured to filter the half sine wave DC voltage to obtain a half sine wave input voltage; and (iv) a flyback power stage circuit configured to receive the half sine wave input voltage and an output control signal of the control circuit, and to obtain a substantially constant output electrical signal at an output of the flyback power stage, where an input current is configured to be in phase with an input voltage of the AC-DC power converter.

In one embodiment, a method of controlling a flyback converter, can include: (i) detecting a drain-source voltage of a power switch of the flyback converter; (ii) turning on the power switch when the drain-source voltage reaches a valley value; (iii) detecting an output electrical signal of the flyback converter, and generating a feedback error signal representing an error between a present output electrical signal and a desired output electrical signal; (iv) generating a conducting time interval according to the feedback error signal; and (v) when the power switch has been conducting for a duration of the conducting time interval, turning off the power switch to maintain an input current in phase with an input voltage of the flyback converter, and to maintain the output electrical signal of the flyback converter as substantially constant.

Embodiments of the present invention can advantageously provide several advantages over conventional approaches. For example, in a single stage power converter, by integrating power factor correction (PFC) and pulse-width modulation (PWM) control modes to form a composite control scheme for the power converter, both power factor correction and output electrical signal adjustment can be achieved. Other advantages of the present invention may become readily apparent from the detailed description of preferred embodiments below.

BRIEF DESCRIPTION OF THE DRAWINGS

FIG. 5B shows example operating waveforms for the sample and hold circuit for the control circuit shown in FIG. 5A.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Power factor correction (PFC) technology is widely used in off-line switch mode power supplies. Most conventional switch mode power supplies that have a PFC function include two stages, where the first stage power converter is used to achieve power factor correction, and the second stage power converter is used to convert the input voltage into output electrical signals to meet driving load requirements. A boost DC-DC converter may have a relatively small output current when the output power is constant, which can reduce the capacity and volume of the output capacitor. In addition, the wire diameter of the boost inductor winding can be reduced, so boost DC-DC converters are used in many first stage power converters.

Figure 1A:
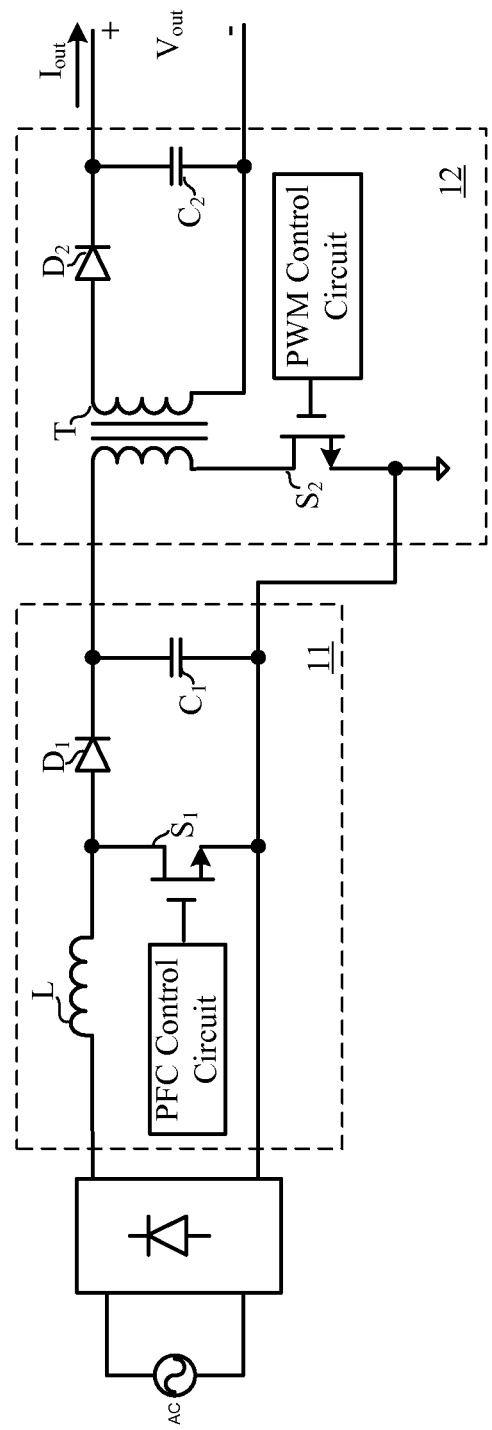
FIG. 1A is a block diagram of an example AC-DC power converter having a power factor correction function.

FIG. 1A shows a block diagram of one example AC-DC power converter having a power factor correction function. This AC-DC power converter can include first stage power converter 11 and second stage power converter 12. For example, first stage power converter 11 can be a boost DC-DC converter to achieve the power factor correction function. Also, second stage power converter 12 may be a flyback converter to convert the input voltage to a substantially constant output current to drive a load (e.g., light-emitting diode (LED) lights). Various control methods for first stage power converter 11 can be utilized, such as continuous conduction mode (CCM), discontinuous conduction mode (DCM), and boundary conduction mode (BCM), according to whether the inductor current is continuous.

Figure 1B:
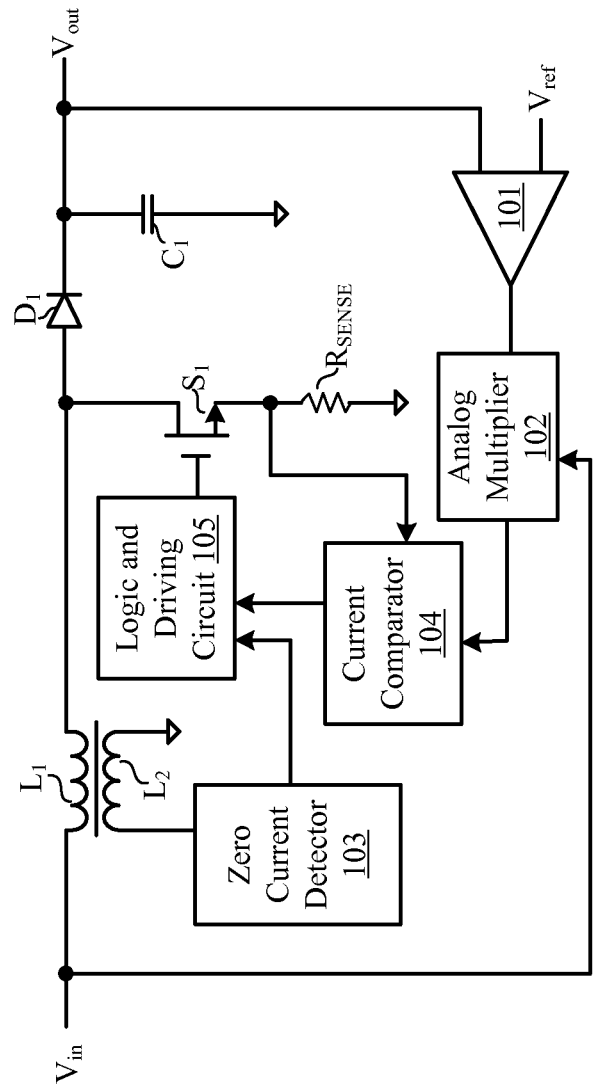
FIG. 1B is a block diagram of a boundary conduction mode control scheme for the first stage voltage converter shown in FIG. 1A.
Figure 1C:
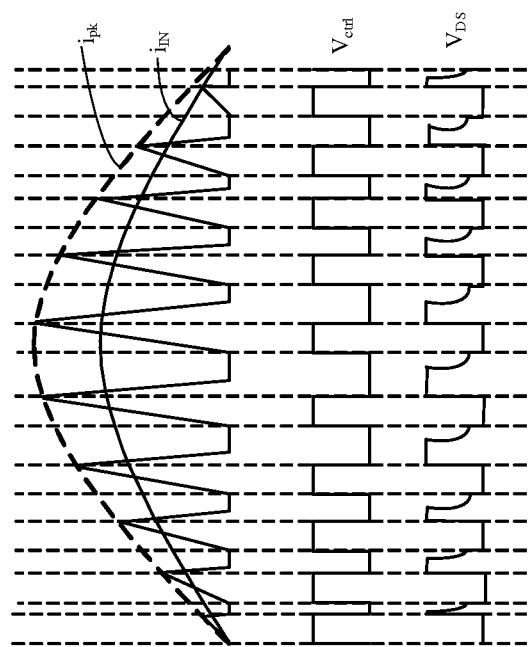
FIG. 1C shows an example control waveform of the power switch and an example inductor current waveform during a half frequency cycle under a boundary conduction mode control scheme.

In a BCM boost power factor correction circuit example, FIG. 1B shows a block diagram of an example BCM control scheme for the first stage voltage converter of FIG. 1A. FIG. 1C shows example half frequency cycle waveforms of power switch control signal and inductor current with the BCM control scheme shown in FIG. 1B.

One particular example operation will now be described. Error amplifier 101 can compare and amplify a feedback signal of output voltage $V_{out}$ against reference signal $V_{ref}$. An output signal generated by error amplifier 101 and AC input voltage detecting signal $V_{in}$ may be input to analog multiplier 102. Analog multiplier 102 can generate a half sine wave output signal that may have a same frequency and phase with the input voltage. When power switch $S_1$ is turned on, resistor $R_{SENSE}$ can detect inductor current $i_L$. When inductor current $i_L$ reaches a level of the output of analog multiplier 102, current comparator 104 can output a control pulse to trigger logic and driving circuit 105 to turn off power switch $S_1$, and inductor $L_1$ can begin to discharge.

In this way, the envelope of inductor current peak $i_{pk}$ may be a half sine wave in a same frequency and phase with input voltage $V_{in}$. When inductor $L_1$ is discharging, a coupling signal of inductor current $i_L$ can be obtained through secondary winding $L_2$, and the coupling signal can be fed to zero current detector 103. When zero current detector 103 detects a zero crossing node of inductor current $i_L$, logic and driving circuit 105 can immediately turn on power switch $S_1$ again, and so forth.

As shown in FIG. 1B, the example boost-type power factor correction circuit can make use of a voltage-current double-loop feedback control and frequency-conversion control method to achieve power factor correction. The average rectify current (e.g., AC input current $I_{in}$) can equal ½ of the inductor current peak value, which is a sinusoidal waveform, and may also have a same phase with the AC sinusoidal input voltage. Thus, the power factor can be about 1.

It can be seen that by using such a power factor correction scheme, two stage power converters may be needed, which can increase the circuit cost and size. Also, such power factor correction schemes sample an input voltage, and through an analog multiplier may receive the input voltage to obtain a half sine wave signal, which the inductor current is forced to follow. Such implementations have relatively complex control schemes. In addition, for an integrated circuit, a separate pin may be required to receive the input voltage, which can increase chip area and overall package size.

A control circuit for the flyback converter in accordance with embodiments of the present invention can obtain a relatively higher power factor, can reduce harmonic distortion, and also may be suitable for a wide variety of applications (e.g., LED drivers, multi-output switching power supply systems, etc.). Also, the composite control scheme may not need to sample the input voltage or utilize a multiplier, thus simplifying the circuit structure, saving chip pins and size for the integrated circuit, improving pin utilization, and simplifying package design. Further, an AC-DC power converter in accordance with embodiments of the invention may require only one stage power converter to achieve power factor correction function and power regulation. This can greatly reduce the cost and size of the circuit realization, while improving circuit reliability and stability, as compared to conventional approaches.

In one embodiment, a control circuit can include: (i) a turn-on signal generating circuit that is configured, in each switching cycle, to receive a drain-source voltage of a power switch of the flyback converter, and to activate a turn-on signal to turn on the power switch when the drain-source voltage reaches a valley value; (ii) a turn-off signal generating circuit that is configured, in each switching cycle, to activate a turn-off signal to turn off the power switch based on a feedback error signal of the power switch after a conducting time interval of the power switch has elapsed; and (iii) where an input current and an input voltage of the flyback converter are configured to be maintained as substantially in phase, and an output electrical signal of the flyback converter is configured to be maintained as substantially constant.

Figure 2:
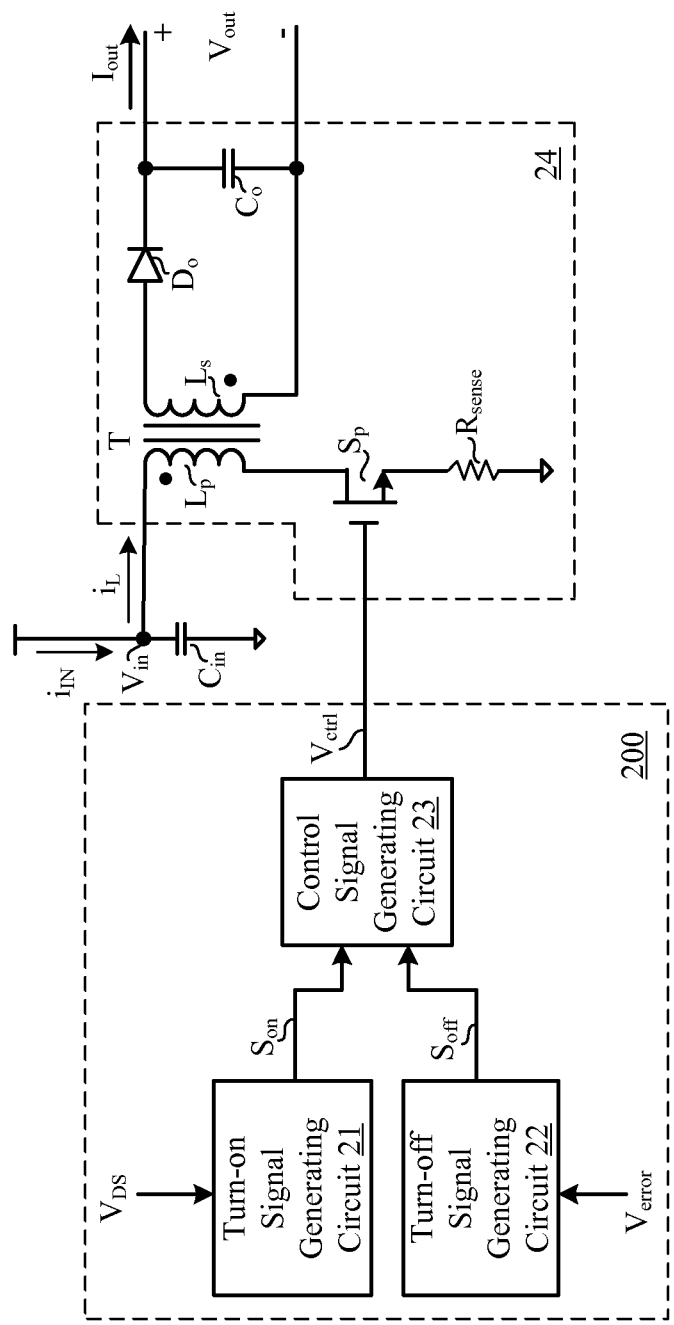
FIG. 2 is a block diagram of an example control circuit for a flyback converter in accordance with embodiments of the present invention.

Referring now to FIG. 2, shown is a block diagram of an example control circuit for a flyback converter in accordance with embodiments of the present invention. In this particular example, control circuit 200 of the flyback converter can include turn-on signal generating circuit 21, turn-off signal generating circuit 22, and control signal generating circuit 23, to control a rear stage of flyback power stage circuit 24.

Example operation of control circuit 200 of the flyback converter shown in FIG. 2 will now be described. In each switching cycle, turn-on signal generating circuit 21 can be used to receive drain-source voltage $V_{DS}$ of power switch $S_p$ in the flyback converter. When drain-source voltage $V_{DS}$ reaches a low voltage or a "valley" voltage ($V_{alley}$), turn-on signal $S_{on}$ can be activated to turn on power switch $S_p$, to achieve quasi-resonant drive for power switch $S_p$. For example, the valley voltage can be a predetermined level, or a low or minimum value within a cycle.

Turn-off signal generating circuit 22 can activate turn-off signal $S_{off}$ after conducting time interval $T_{on}$ of power switch $S_p$, according to feedback error signal $V_{error}$ of the power switch $S_p$ in the flyback converter. Turn-off signal $S_{off}$ can be used to turn off power switch $S_p$. Control signal generating circuit 23 can connect to turn-on signal generating circuit 21 and turn-off signal generating circuit 22, and may generate control signal $V_{ctrl}$ to control a switching operation of power switch $S_p$ according to turn-on signal $S_{on}$ and turn-off signal $S_{off}$.

In a switching cycle, when turn-on signal $S_{on}$ is active, control signal $V_{ctrl}$ can be used to turn on power switch $S_p$. After conducting time period $T_{on}$, when turn-off signal $S_{off}$ is active, control signal $V_{ctrl}$ can turn off power switch $S_p$. As this cycle repeats, periodic turn-on and turn-off of the power switch can be achieved based on control signal $V_{ctrl}$.

Feedback error signal $V_{error}$ can characterize an error between a present output electrical signal and a desired output electrical signal. Power switch $S_p$ can be turned on when drain-source voltage $V_{DS}$ reaches valley value $V_{valley}$ by adjusting conducting time interval $T_{on}$ through feedback error signal $V_{error}$. Also, inductor current $i_L$ flowing through primary winding $L_p$ of transformer T can be utilized for regulating the average value of the inductor current. In this way, an output electrical signal of flyback power stage circuit 24 can remain substantially constant, and input current $i_{IN}$ can remain in phase with input voltage $V_{in}$ of flyback circuit 24. In addition, a relatively higher power factor can be obtained.

It can be seen that, with usage of a control circuit of a flyback converter as shown in FIG. 2, there may be no need for a separate boost-type power factor correction circuit between the flyback power stage circuit and the rectifier circuit. In addition, there may be no need to sample input voltage $V_{in}$ or use an analog multiplier to obtain a half sine wave reference voltage, which can greatly simplify the circuit structure. Further, through the feedback error signal's effect on regulation of the conducting time of the power switch, a constant output electrical signal, as well as a relatively higher power factor, can be obtained. Also, using quasi-resonant control and driving solutions may not only reduce switching losses, but may also improve efficiency of the flyback converter. Finally, because there may be no need for a separate chip pin to sample an input voltage in an integrated circuit, chip size can be reduced, and external pin utilization can be improved.

Figure 3A:
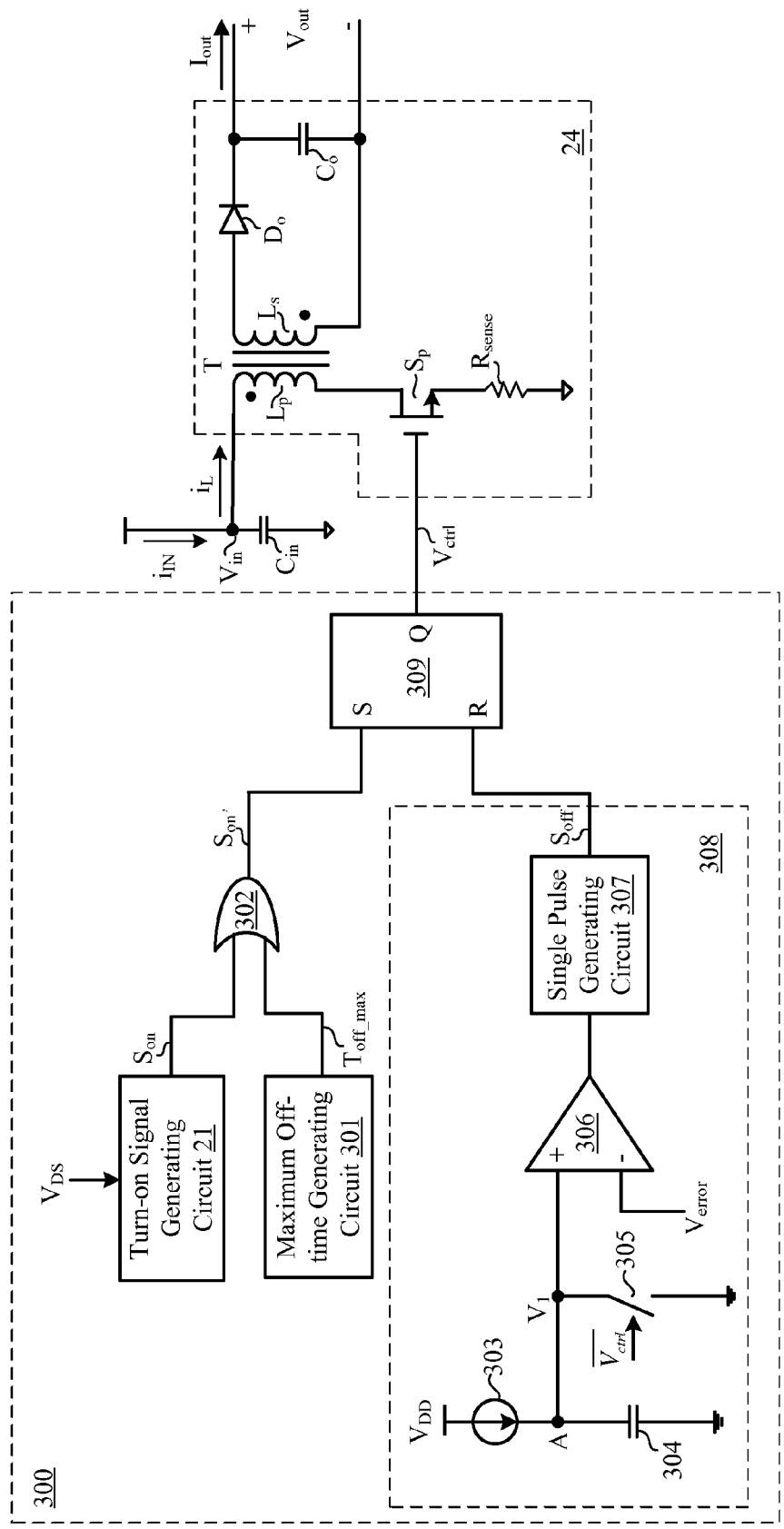
FIG. 3A is a block diagram of another example control circuit for a flyback converter in accordance with embodiments of the present invention.

Referring now to FIG. 3A, shown is a block diagram of another example control circuit of a flyback converter, in accordance with embodiments of the present invention. In this particular example, turn-on signal generating circuit 21 can receive drain-source voltage $V_{DS}$ of power switch $S_p$, and may generate turn-on signal $S_{on}$ when drain-source voltage $V_{DS}$ reaches a valley value level. Turn-on signal generating circuit 21 can be implemented using any suitable form of detection circuitry to achieve drain-source voltage valley detection (e.g., quasi-resonant control, a soxyless solution, etc.).

Furthermore, in order to maintain adjustment of output electric signals when the load is relatively small, and to prevent erroneous turn-off of the power switch, maximum off-time generating circuit 301 can be used to generate maximum off-time $T_{off\_max}$, to provide a maximum off-time of the power switch. For example, when the drain-source voltage $V_{DS}$ reaches a valley value, or the off-time reaches the maximum off-time, turn-on signal $S_{on}'$ can be generated via OR-gate 302.

Turn-off signal generating circuit 308 can be used for generating conducting time interval $T_{on}$ via turn-off signal $S_{off}$, which may be in proportion to feedback error signal $V_{error}$. Off-time signal generating circuit 308 can include constant current source 303 and capacitor 304 which can connect between voltage source $V_{DD}$ and ground with common connection node A. Switch 305 can connect between node A and ground, and may be controlled through an inversion of control signal $V_{ctrl}$. A non-inverting input terminal of comparator 306 can connect to node A, while an inverting input terminal can receive feedback error signal $V_{error}$. An output terminal of comparator 306 can generate turn-off signal $S_{off}$ through single-pulse or one-shot generating circuit 307.

In this particular example, the control signal generating circuit can include RS flip-flop 309, where a set terminal can receive turn-on signal $S_{on}'$, while a reset terminal can receive turn-off signal $S_{off}$. The output signal generated at an output terminal RS flip-flop 309 can be configured as control signal $V_{ctrl}$ to control a switching operation of power switch $S_p$.

Figure 3B:
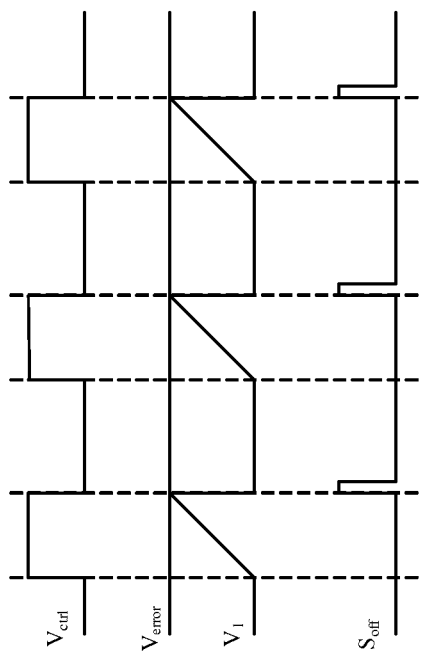
FIG. 3B shows an example operating waveform of an example turn-off signal generating circuit for the control circuit shown in FIG. 3A.

An example operation of a turn-off signal generating circuit of particular embodiments (e.g., as shown in FIG. 3A) will be described in conjunction the example waveforms in FIG. 3B. During a conducting time interval of the power switch (e.g., when control signal $V_{ctrl}$ is active), switch 305 may be turned off, and constant current source 303 can charge capacitor 304. Thus, voltage $V_1$ at node A can turn into a ramp signal that continues to rise.

After conducting time interval $T_{on}$ has elapsed, and when voltage $V_1$ is increased to feedback error signal $V_{error}$, an output of comparator 306 may change state, and single pulse turn-off signal $S_{off}$ can be activated through single-pulse generating circuit 307. Turn-off signal $S_{off}$ can reset RS flip-flop 309, and output signal $V_{ctrl}$ at output terminal Q of RS flip-flop 309 can become inactive. For example, output signal $V_{ctrl}$ can go from high to low to turn off power switch $S_p$. When drain-source voltage $V_{DS}$ reaches the valley value again, turn-on signal $S_{on}'$ can set RS flip-flop 309 through set terminal S of RS flip-flop 309, and output signal $V_{ctrl}$ can be activated at output terminal Q. For example, output signal $V_{ctrl}$ can go from low to high to turn on power switch $S_p$ once again. Also, switch 305 can be turned on, and voltage $V_1$ across capacitor 304 can be relatively quickly discharged to ground through switch 305.

If a current of constant current source 303 is $I_1$, and a capacitance value of capacitor 304 is $C_1$, a conducting time interval $T_{on}$ can be expressed as in formula (1).

$$T_{on} = \frac{V_{error}}{I_1/C_1} = \frac{V_{error} \times C_1}{I_1} = k \times V_{error} \quad (1)$$

During a half cycle of the input voltage, feedback error signal $V_{error}$ can maintain substantially constant, so conducting time interval $T_{on}$ can be substantially unchanged and may share a proportional relationship with feedback error signal $V_{error}$.

Figure 3C:
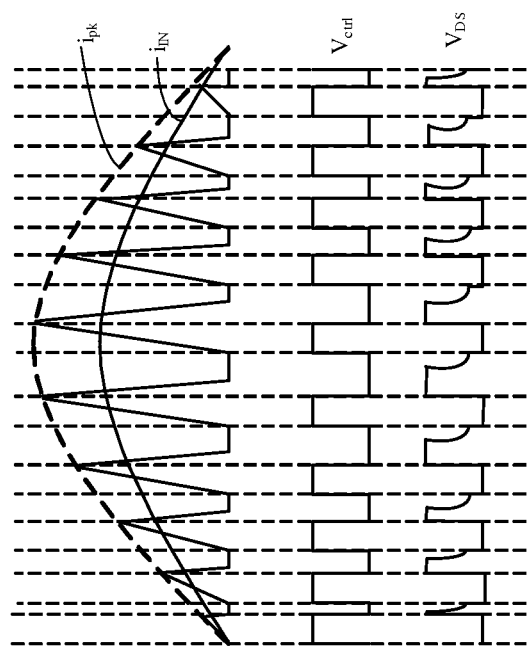
FIG. 3C shows an example operating waveform of the control circuit shown in FIG. 3A.

In conjunction with example operation waveforms shown in FIG. 3C, example operation of the control circuit of the flyback converter shown in FIG. 3A will be described. If the inductance value of transformer T is L, the primary winding of the transformer T is $L_p$, the inductor current peak $i_{pk}$ through the primary winding $L_p$ can be expressed as the following formula (2) based on flyback power stage circuit operation principles.

$$i_{pk} = \frac{V_{in}}{L} \times T_{on} = \frac{V_{in}}{L} \times k \times V_{error} \quad (2)$$

As feedback error signal $V_{error}$ can be maintained as substantially constant, inductance value L can be a substantially constant value. Thus, peak inductor current $i_{pk}$ can be proportional to input voltage $V_{in}$ (e.g., the envelope of inductor current peak $i_{pk}$ can be a sinusoidal shape). Further, because a flyback converter can be driven in a quasi-resonant mode, the operating mode of primary winding $L_p$ of transformer T can be approximated as a boundary conduction mode (BCM). Thus, input current $i_{IN}$ can be approximated as shown below in formula (3).

$$i_{IN} \approx \frac{1}{2} \times i_{pk} \approx \frac{V_{in}}{2L} \times k \times V_{error} \quad (3)$$

As can be seen in the above formula (3), input current $i_{IN}$ can follow input voltage $V_{in}$, and the input impedance can be a constant value. Thus, a relatively higher power factor can be obtained. Also, peak inductor current $i_{pk}$ can be adjusted by feedback error signal $V_{error}$, to ensure the output electrical signal is substantially consistent with a desired output electrical signal.

Those skilled in the art will recognize that other circuit implementations for the control circuit and/or the flyback converter can be accommodated in particular embodiments. For example, the turn-off signal generating circuit, the control signal generating circuit, and/or the turn-on signal generating circuit can be implemented by any other suitable circuit structures.

Figure 4A:
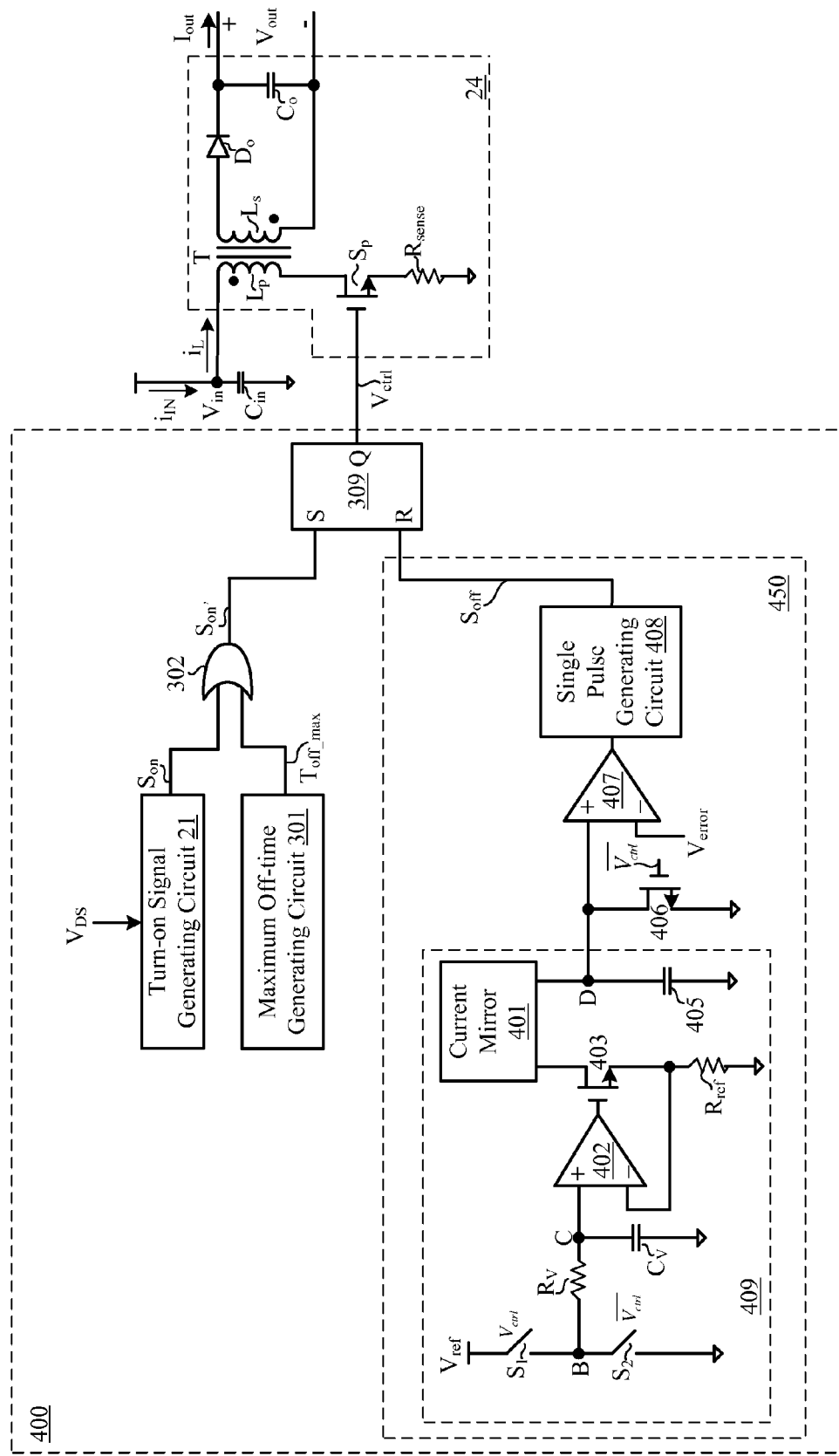
FIG. 4A is a block diagram of yet another example control circuit for a flyback converter in accordance with embodiments of the present invention.
Figure 4B:
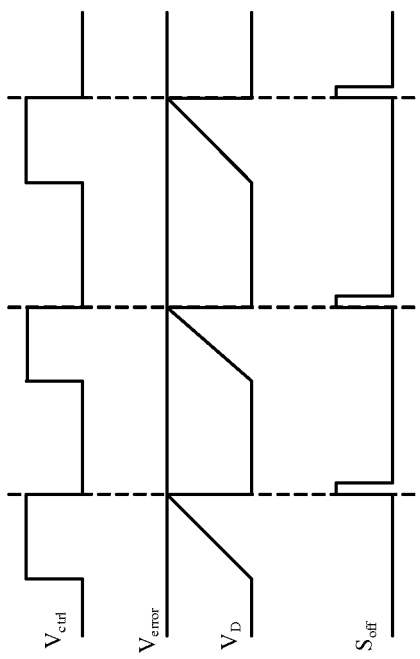
FIG. 4B shows an example operating waveform of an example turn-off signal generating circuit for the control circuit shown in FIG. 4A.

Referring now to FIG. 4A, shown is a block diagram of yet another example control circuit of a flyback converter, in accordance with embodiments of the present invention. As compared with the example control circuit shown in FIG. 3A, a different turn-off signal generating circuit 450 can be employed such that the flyback power stage circuit can operate under a discontinuous conduction mode (DCM). The conducting time and conducting duty cycle of the power switch can remain basically unchanged.

In circuit 409, switches $S_1$ and $S_2$ can be series connected between reference voltage $V_{ref}$ and ground with common connection node B. Control signal $V_{ctrl}$ can control a switching operation of switch $S_1$, and an inversion of control signal $V_{ctrl}$ can control a switching operation of switch $S_2$. Resistor $R_v$ and capacitor G can connect in series between node B and ground with common connection node C. Filtered by resistor $R_v$ and capacitor $C_v$, a voltage at node B can be converted to voltage $V_C$ at node C, which can be proportional to a conducting duty cycle D of the power switch, and voltage $V_C$ may be as shown below in formula (5).

$$V_c = V_{ref} \times D \quad (5)$$

Through a voltage-current conversion circuit formed by operational amplifier 402, switch 403, and resistor $R_{ref}$, voltage $V_C$ can be converted to a current signal. The non-inverting input terminal of operational amplifier 402 can receive voltage $V_C$, and the inverting input terminal can connect to one end of resistor $R_{ref}$, while the other end of resistor $R_{ref}$ can connect to ground. A control terminal of switch 403 can receive an output signal of operational amplifier 402. A second power terminal of switch 403 can connect to one end of resistor $R_{ref}$ and the first power terminal can connect to current mirror 401. According to the "virtual short circuit" of an operational amplifier, current $I_1$ flowing through switch 403 can be represented as per formula (6).

$$I_1 = \frac{V_{ref}}{R_{ref}} \times D \quad (6)$$

Current $I_1$, through the mirroring effect of current mirror 401, can generate charging current (reference current) $I_{ref}$ for capacitor 405, where the value can be as per formula (7).

$$I_{ref} = \frac{V_{ref}}{R_{ref}} \times D \times k \quad (7)$$

Here, k is the coefficient of proportionality of current mirror 401. Voltage $V_D$ can be generated at common connection node D of current mirror 401 and capacitor 405. Switch 406 can connect between node D and ground, and an inversion of control signal $V_{ctrl}$ can control switch 406. The non-inverting input terminal of comparator 407 can receive voltage $V_D$, and the inverting input terminal can receive feedback error signal $V_{error}$. When power switch $S_p$ of flyback power stage circuit 24 is on (e.g., control signal $V_{ctrl}$ is active), switch 406 may be off, and charging current (reference current) $I_{ref}$ can keep charging capacitor 405. Thus, so voltage $V_D$ can turn to a ramp shape and continue to rise.

When voltage $V_D$ rises to a level of feedback error signal $V_{error}$, an output signal at an output terminal of comparator 407 may change state, and single-pulse generating circuit 408 can generate a single pulse signal (e.g., turn-off signal $S_{off}$). Control signal $V_{ctrl}$ may become inactive (e.g., go from high to low) at substantially the same time, to turn off power switch $S_p$. Switch 406 may be turned on, and voltage $V_D$ across capacitor 405 can be relatively quickly discharged to ground through switch 406. When drain-source voltage $V_{DS}$ reaches a level of valley value $V_{valley}$ again, power switch $S_p$ can be turned on.

If the capacitance value of capacitor 405 is $C_2$, the rising time of voltage $V_D$ (e.g., the conducting time interval $T_{on}$) can be expressed as below in formula (8).

$$T_{on} = \frac{V_{error} \times C_2}{(V_{ref}/R_{ref}) \times D \times k} = \frac{V_{error} \times C_2 \times R_{ref}}{V_{ref} \times D \times k} \quad (8)$$

By rearranging the D term (duty cycle of the power switch), formula (8) can be changed to formula (9).

$$T_{on} \times D = \frac{V_{error} \times C_2 \times R_{ref}}{V_{ref} \times k} \quad (9)$$

As can be seen from equation (9), during a half cycle of the input voltage, feedback error signal $V_{error}$ can be maintained as substantially constant. Thus, the product of the conducting time $T_{on}$ and the conducting duty cycle D of the power switch $S_p$ can be maintained as substantially unchanged.

Figure 4C:
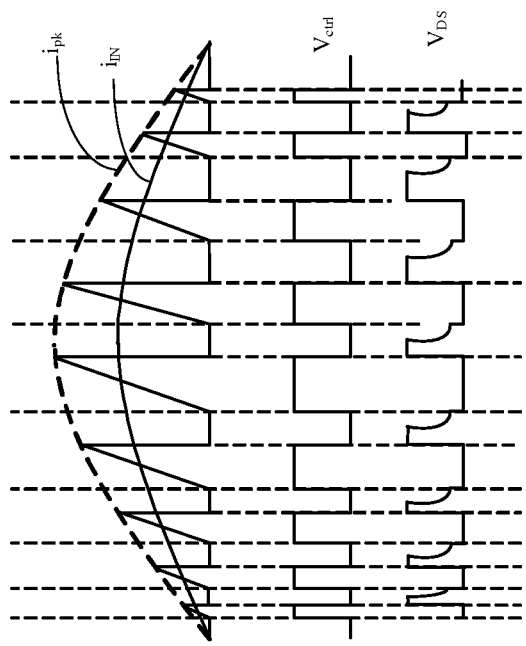
FIG. 4C shows an example operating waveform of the control circuit shown in FIG. 4A.

Example operation of the control circuit of the flyback converter shown in FIG. 4A will now be described in accordance with the example operation waveform diagram shown in FIG. 4C. As the inductor current of the flyback converter works in DCM, inductor current peak $i_{pk}$ flowing through the primary winding $L_p$ of the transformer T can be obtained based on flyback converter operating principles, as shown in formula (10).

$$i_{pk} = \frac{V_{in}}{L} \times T_{on} = \frac{V_{in}}{L} \times k \times V_{error} \quad (10)$$

As primary winding $L_p$ of transformer T operates in DCM, input current $i_{IN}$ can be represented as shown below in formula (11).

$$i_{IN} = \frac{1}{2} \times i_{pk} \times D = \frac{V_{in}}{2L} \times T_{on} \times D = \frac{V_{in}}{2L} \times \frac{V_{error} \times C_2 \times R_{ref}}{V_{ref} \times k} \quad (11)$$

As can be seen from the above formula (11), input current $i_{IN}$ can follow input voltage $V_{in}$, and the input impedance may be a constant value. Therefore, a relatively higher power factor can be obtained. Further, peak inductor current $i_{pk}$ can be adjusted by feedback error signal $V_{error}$, to ensure consistency between an output electrical signal of the flyback power stage circuit and a desired output electrical signal. Further, use of the example control circuit of the flyback converter shown in FIG. 4A can achieve power factor correction, so the fundamental component may be relatively large, and correspondingly, a total harmonic distortion (THD) of the input current can be relatively small.

Those skilled in the art will recognize that other circuit implementations than those described herein can also be accommodated in particular embodiments. For example, the turn-off signal generating circuit, the control signal generating circuit, and/or the turn-on signal generating circuit as shown can be implemented in any other suitable circuit structures. Feedback error signal $V_{error}$ can also be generated by different implementations. Further, an output electrical signal of the flyback converter can be a voltage signal and/or a current signal. In addition, the feedback control circuit can use either primary side control or secondary side control. In this way, a feedback error signal can be generated according to an electrical signal and a reference signal of the flyback converter. Also, the feedback control circuit may be any suitable feedback control circuit implementation.

In order to reduce ripple voltage of feedback error signal $V_{error}$, the control circuit of the flyback converter in particular embodiments can also include a circuit configured to sample and hold feedback error signal $V_{error}$ based on a cycle of the input voltage. In this way, a relatively smooth feedback error signal $V_{error}$ can be obtained.

Figure 5A:
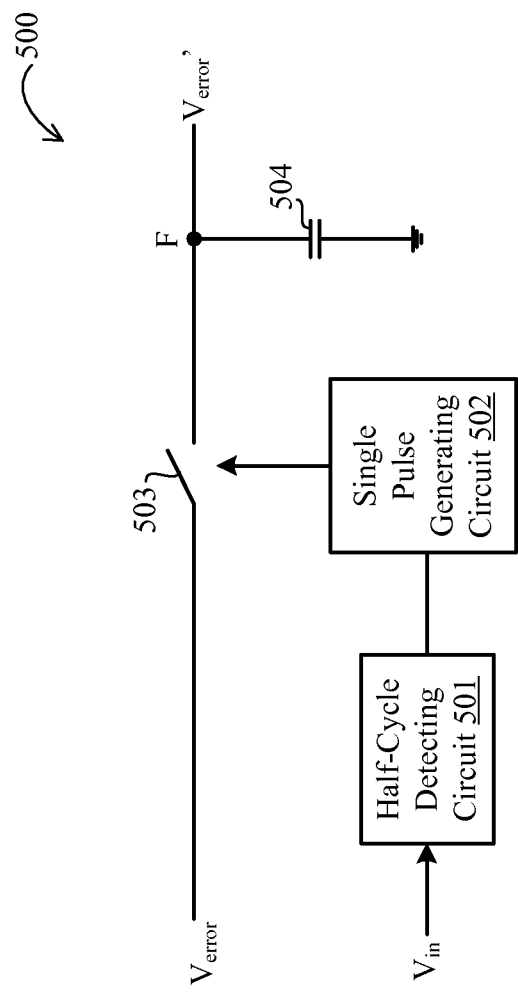
FIG. 5A is a block diagram of an example sample and hold circuit of a control circuit for a flyback converter in accordance with embodiments of the present invention.

Referring now to FIG. 5A, shown is a block diagram of an example sample and hold circuit of the control circuit of the flyback converter, in accordance with embodiments of the present invention. Also shown is an example operation waveform diagram in FIG. 5B. Sample and hold circuit 500 can include half-cycle detection circuit 501, single-pulse generating circuit 502, switch 503, and capacitor 504. Half-period detection circuit 501 can receive half sine wave input voltage $V_{in}$, and when half sine wave input voltage $V_{in}$ crosses zero (e.g., starting timing and ending timing of the half cycle), single pulse signal $V_{tri}$ can be generated by single-pulse generating circuit 502.

When half sine wave input voltage $V_{in}$ crosses zero, single pulse signal $V_{tri}$ can turn on switch 503. Also, feedback error signal $V_{error}$ can be filtered through capacitor 504, such that a voltage (e.g., feedback error signal $V_{error}$) can be generated at common connecting node F of capacitor 504 and switch 503.

In this half cycle of half sine wave input voltage $V_{in}$, feedback error signal $V_{error}$ can remain as a sampled value at beginning time $t_0$ of the current half cycle until beginning time $t_1$ of a next half cycle (e.g., the ending time of the current half cycle). In this way, a substantially ripple-free and relatively smooth feedback error signal $V_{error}$ can be obtained at node F.

Half-cycle detection circuit 501 can be a zero-crossing comparator, or any other suitable circuit structure. Through the example sample and hold circuit shown in FIG. 5A, feedback error signal $V_{error}$, with a relatively small ripple can be obtained. In this way, a more accurate reference can be provided for the rear control circuit to adjust the conducting time interval, and to improve control accuracy of the control circuit.

In one embodiment, a method of controlling a flyback converter, can include: (i) detecting a drain-source voltage of a power switch of the flyback converter; (ii) turning on the power switch when the drain-source voltage reaches a valley value; (iii) detecting an output electrical signal of the flyback converter, and generating a feedback error signal representing an error between a present output electrical signal and a desired output electrical signal; (iv) generating a conducting time interval according to the feedback error signal; and (v) when the power switch has been conducting for a duration of the conducting time interval, turning off the power switch to maintain an input current in phase with an input voltage of the flyback converter, and to maintain the output electrical signal of the flyback converter as substantially constant.

Figure 6:
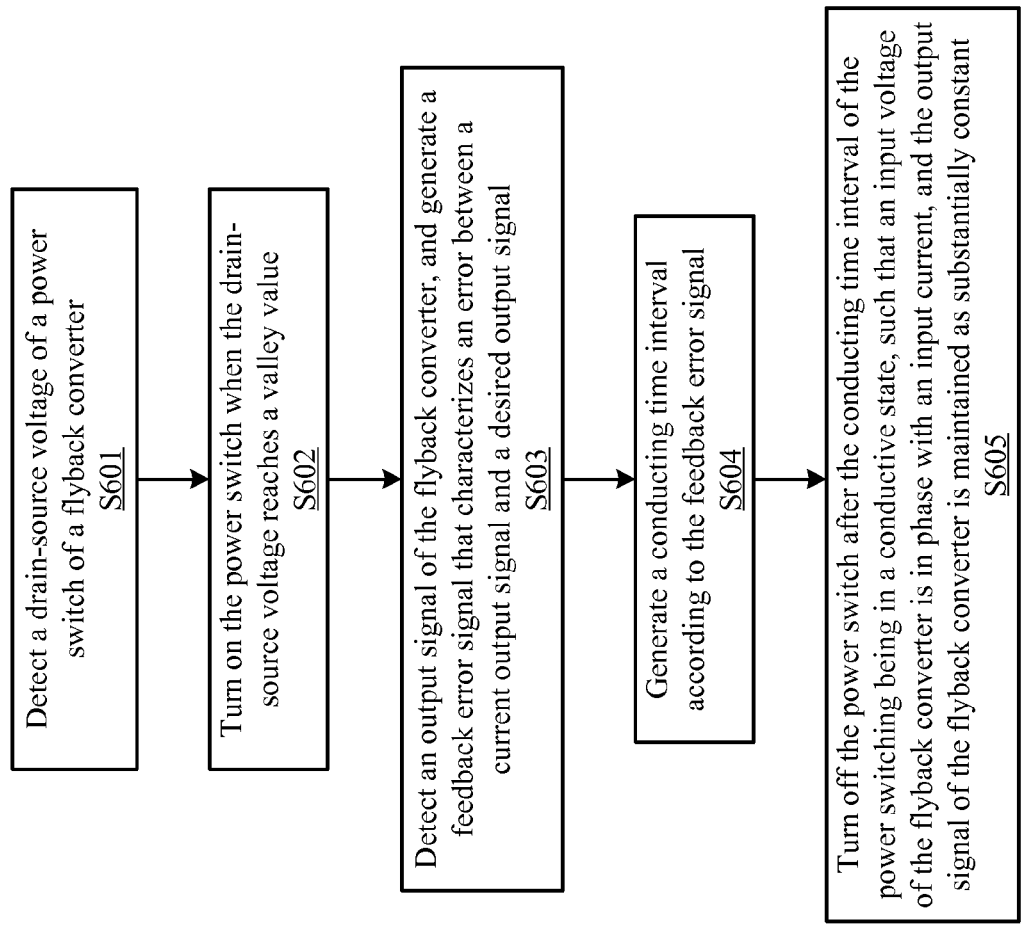
FIG. 6 is a flow diagram of an example control method of a control circuit for a flyback converter in accordance with embodiments of the present invention.

Referring now to FIG. 6, shown is a flow diagram of an example control method for a flyback converter. At S601, a drain-source voltage of a power switch of the flyback converter can be detected. At S602, the power switch can be turned on when the drain-source voltage reaches a valley value (e.g., a predetermined or cyclic minimum value). At S603, an output electrical signal (e.g., voltage, current, etc.) of the flyback converter can be detected. Also, a feedback error signal that characterizes an error between a current output electrical signal and a desired output electrical signal can be generated. At S604, a conducting time interval can be generated based on the feedback error signal.

At S605, the power switch can be turned off after the conducting time interval has elapsed. In this way, an input current can be in phase with an input voltage of the flyback converter, and the output electrical signal of the flyback converter can be maintained as substantially constant. In this particular example control method of the flyback converter, the conducting time interval and the feedback error signal have a proportional (e.g., a direct proportionality) relationship.

In the half cycle of the sinusoidal input voltage of the flyback converter, the feedback error signal can remain essentially unchanged, and the inductance value of the primary winding of the flyback converter can be substantially constant. Thus, the inductor current peak may have a proportional relationship with the half sine wave input voltage. For example, the envelope of the inductor current peak may be of a sinusoidal shape. Also, the flyback converter can be driven via a quasi-resonant mode, so the operating mode of the primary winding of the transformer can be approximated as BCM (or DCM, in some cases). Therefore, the input current can follow the sinusoidal input voltage to achieve power factor correction. Further, through adjustment of the feedback error signal based on the conducting time interval, regulation of the output electrical signal of the flyback converter can be achieved, such that the output electrical signal (e.g., voltage and/or current) can be maintained substantially constant.

In an example control method of a flyback converter, the conducting time interval may be in direct proportion to the feedback error signal, and in inverse proportion to the conducting duty cycle of the power switch. In the half cycle of the sinusoidal input voltage of the flyback converter, the feedback error signal can remain essentially unchanged and the inductance value of the primary winding of the flyback converter can be a substantially constant value. By controlling the conducting time interval of the power switch of the flyback converter and the duty cycle as substantially constant, the inductor current peak can be in direct proportion to the half sine wave input voltage. For example, the envelope of the inductor current peak can be of a substantially sinusoidal shape.

In particular embodiments, the conducting time interval can be adjusted by any suitable implementation. Further, the control method can also include sample and hold of the feedback error signal according to the half sine wave input voltage cycle of the flyback converter. In this way, a feedback error signal with a relatively small ripple can be obtained. Further, the control method can also include turning on the power switch if the off-time of the power switch exceeds a predetermined maximum turn-off signal.

In one embodiment, an AC-DC power converter can include: (i) the control circuit as above; (ii) a rectifier circuit configured to convert an external AC sinusoidal voltage to a half sine wave DC voltage; (iii) a filter circuit configured to filter the half sine wave DC voltage to obtain a half sine wave input voltage; and (iv) a flyback power stage circuit configured to receive the half sine wave input voltage and an output control signal of the control circuit, and to obtain a substantially constant output electrical signal at an output of the flyback power stage, where an input current is configured to be in phase with an input voltage of the AC-DC power converter.

Figure 7:
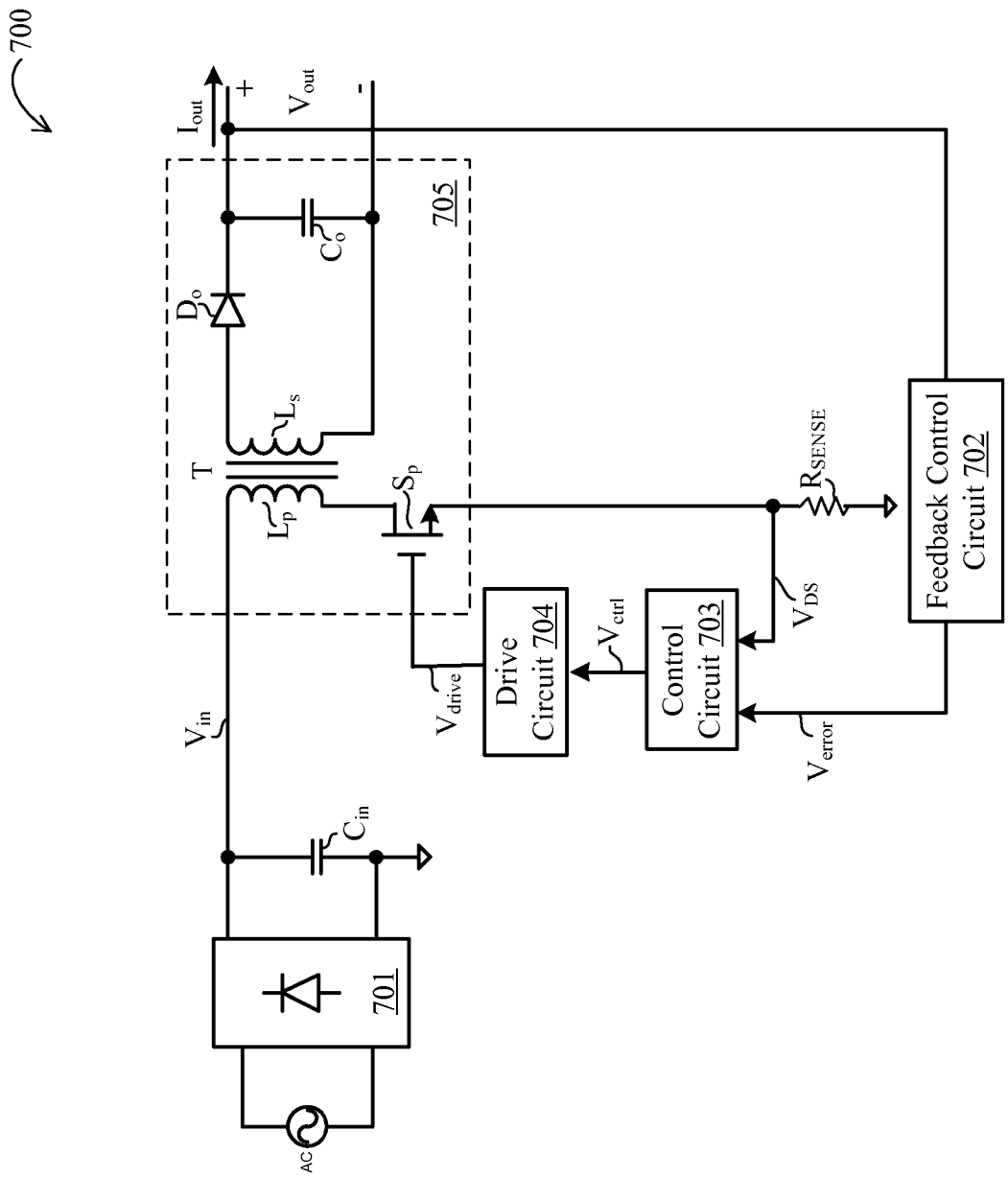
FIG. 7 is a block diagram of an example AC-DC power converter in accordance with embodiments of the present invention.

Referring now to FIG. 7, shown is a block diagram of an example AC-DC power converter, in accordance with embodiments of the present invention. The AC-DC power converter 700 can include rectifier circuit 701, filter circuit $C_{in}$, flyback power stage circuit 705, control circuit 703, and drive circuit 704. Rectifier circuit 701 can receive an external AC input voltage, and convert it to a DC voltage. A half sine wave input voltage $V_{in}$ can be obtained after being filtered through filter circuit $C_{in}$.

Control circuit 703 can be a control circuit of the flyback converter as described above (e.g., as shown above in FIG. 2, FIG. 3A, FIG. 4A, FIG. 5A, etc.). Control circuit 703 can receive feedback error signal $V_{error}$ and drain-source voltage $V_{DS}$ of power switch $S_p$ to generate control signal $V_{ctrl}$. Feedback error signal $V_{error}$ can be obtained by sampling the output electrical signal of flyback power level circuit 705 through feedback control circuit 702. Drive circuit 704 can receive control signal $V_{ctrl}$, and correspondingly generate drive signal $V_{drive}$.

Flyback power stage circuit 705 can receive half sine wave input voltage $V_{in}$ and output drive signal $V_{drive}$ of drive circuit 704, such that power switch $S_p$ can carry out the corresponding switching operation. In this way, a substantially constant output signal can be obtained at the output terminal of flyback power stage circuit 705. Also, the input current may be in phase with input voltage of the AC-DC power converter.

The above has described some example embodiments of the present invention, but practitioners with ordinary skill in the art will also recognize that other techniques or circuit structures can also be applied in accordance with embodiments of the present invention. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A control circuit for a flyback converter, the control circuit comprising:
   a) a turn-on signal generating circuit that is configured, in each switching cycle, to receive a drain-source voltage of a power switch of said flyback converter, and to activate a turn-on signal to turn on said power switch when said drain-source voltage reaches a valley value;
   b) a turn-off signal generating circuit that is configured, in each switching cycle, to activate a turn-off signal to turn off said power switch based on a feedback error signal of said flyback converter after a conducting time interval of said power switch has elapsed, wherein said conducting time interval is in direct proportion to said feedback error signal, and in inverse proportion to a conducting duty cycle of said power switch; and
   c) said flyback converter being configured to receive an input current and an input voltage, wherein said input current and said input voltage of said flyback converter are maintained as substantially in phase for power factor correction (PFC) by activation of said turn-on signal and said turn-off signal, and an output electrical signal of said flyback converter is configured to be maintained as substantially constant.

2. The control circuit of claim 1, wherein said feedback error signal is generated by sampling said output electrical signal of said fl back converter.

3. The control circuit of claim 1, wherein said flyback converter operates in a discontinuous conduction mode (DCM).

4. The control circuit of claim 1, wherein said control circuit further comprises a sample and hold circuit configured to sample and hold said feedback error signal according to a sinusoidal half wave input voltage cycle of said flyback converter.

5. The control circuit of claim 4, wherein said sample and hold circuit comprises a half-cycle detecting circuit configured to receive said input voltage, and to provide a signal to a single pulse generating circuit.

6. The control circuit of claim 1, wherein said control circuit further comprises:
   a) a control signal generating circuit configured to receive said turn-on and turn-off signals, and to generate a control signal to control said power switch;
   b) wherein said control signal is configured to turn on said power switch when said turn-on signal is active; and
   c) wherein said control signal is configured to turn off said power switch when said turn-off signal is inactive.

7. An AC-DC power converter, comprising:
   a) the control circuit of claim 1;
   b) a rectifier circuit configured to convert an external AC sinusoidal voltage to a half sine wave DC voltage;
   c) a filter circuit configured to filter said half sine wave DC voltage to obtain a half sine wave input voltage; and
   d) a flyback power stage circuit configured to receive said half sine wave input voltage and an output control signal of said control circuit, and to obtain a substantially constant output electrical signal at an output of said flyback power stage, wherein an input current is configured to be in phase with an input voltage of said AC-DC power converter.

8. The control circuit of claim 1, wherein said control circuit further comprises a maximum off-time generating circuit configured to generate a maximum off-time signal, wherein said power switch is configured to conduct when said maximum turn-off signal is active.

9. The control circuit of claim 1, wherein said feedback error signal is determined without sampling said input voltage of said flyback converter.

10. The control circuit of claim 1, wherein said turn-on signal is activated when said drain-source voltage reaches said valley value by adjustment of said conducting time interval through said feedback error signal.

11. The control circuit of claim 1, wherein:
   a) said power switch is turned off through a single pulse generating circuit that is coupled to an output of a comparator and an input of a flip-flop; and
   b) said comparator is configured to receive said feedback error signal, and said flip-flop is configured to generate a control signal to directly control said power switch.

12. The control circuit of claim 11, wherein a voltage at a non-inverting input of said comparator is configured to be discharged when said control signal is inactive.

13. The control circuit of claim 12, wherein said turn-off signal generating circuit comprises a current mirror coupled to said non-inverting input of said comparator.

14. The control circuit of claim 1, wherein said feedback error signal is substantially constant during a half cycle of said input voltage.

15. A method of controlling a flyback converter, the method comprising:
   a) detecting a drain-source voltage of a power switch of said flyback converter, wherein said flyback converter receives an input current and an input voltage;
   b) turning on said power switch when said drain-source voltage reaches a valley value;
   c) detecting an output electrical signal of said flyback converter for generating a feedback error signal that represents an error between a present output electrical signal and a desired output electrical signal;
   d) generating a conducting time interval according to said feedback error signal, wherein said conducting time interval is in direct proportion to said feedback error signal, and in inverse proportion to a conducting duty cycle of said power switch;
   e) turning off said power switch when said power switch has been conducting for a duration of said conducting time interval; and
   f) maintaining said input current in phase with said input voltage of said flyback converter for power factor correction (PFC) by controlling said turning on and said turning off of said power switch, and maintaining said output electrical signal of said flyback converter as substantially constant.

16. The method of claim 15, wherein said flyback converter operates in a discontinuous conduction mode (DCM).

17. The method of claim 15, wherein said feedback error final is substantially constant.

18. The method of claim 15, further comprising sampling and holding said feedback error signal according to a sinusoidal half wave input voltage cycle of said flyback converter.

19. The method of claim 15, further comprising generating a maximum off-time signal, wherein said power switch is configured to conduct when said maximum turn-off signal is active.

20. The method of claim 15, wherein said turning off said power switch comprises using a single pulse generating circuit that is coupled to an output of a comparator and an input of a flip-flop.

* * * * *